United States Patent
Buckenmaier et al.

(10) Patent No.: US 10,152,191 B2
(45) Date of Patent: Dec. 11, 2018

(54) METHOD FOR OPERATING MACHINERY USING A BROWSER

(75) Inventors: Matthias Buckenmaier, Weinheim (DE); Werner Hammann, Neustadt an der Weinstrasse (DE); Achim Scheurer, Bellheim (DE)

(73) Assignee: Heidelberger Druckmaschinen AG, Heidelberg (DE)

( * ) Notice: Subject to any disclaimer, the term of this patent is extended or adjusted under 35 U.S.C. 154(b) by 982 days.

(21) Appl. No.: 13/295,263

(22) Filed: Nov. 14, 2011

(65) Prior Publication Data

US 2012/0123565 A1   May 17, 2012

(30) Foreign Application Priority Data

Nov. 11, 2010 (DE) .................... 10 2010 051 028

(51) Int. Cl.
*G06F 3/0481* (2013.01)
*G06F 9/54* (2006.01)
*H04L 29/08* (2006.01)
*H04L 29/06* (2006.01)
*G05B 19/409* (2006.01)
*G06F 3/0484* (2013.01)
*G06F 9/451* (2018.01)

(52) U.S. Cl.
CPC .......... *G06F 3/0481* (2013.01); *G05B 19/409* (2013.01); *G06F 3/04842* (2013.01); *G06F 9/54* (2013.01); *H04L 65/1059* (2013.01); *H04L 67/04* (2013.01); *H04L 67/36* (2013.01); *H04L 69/329* (2013.01); *G05B 2219/35488* (2013.01); *G05B 2219/36137* (2013.01); *G05B 2219/36142* (2013.01); *G05B 2219/45187* (2013.01); *G06F 9/451* (2018.02); *G06F 2209/545* (2013.01)

(58) Field of Classification Search
CPC .......... G06F 3/0481; G06F 9/451; G06F 9/54; G06F 2209/545; H04L 65/10; H04L 65/1059; H04L 67/04; H04L 67/36; H04L 69/329
USPC ........................................... 700/83
See application file for complete search history.

(56) References Cited

U.S. PATENT DOCUMENTS

| | | |
|---|---|---|
| 5,734,380 A | 3/1998 | Adams et al. |
| 5,742,778 A | 4/1998 | Hao et al. |
| 6,983,422 B1 | 1/2006 | Günther |

(Continued)

FOREIGN PATENT DOCUMENTS

| | | |
|---|---|---|
| DE | 200 04 370 U1 | 7/2001 |
| DE | 10 2005 035 847 A1 | 3/2006 |

(Continued)

OTHER PUBLICATIONS

German Patent and Trademark Office Search Report, dated July 11, 2011.

(Continued)

*Primary Examiner* — Crystal J Barnes-Bullock
(74) *Attorney, Agent, or Firm* — Laurence A. Greenberg; Werner H. Stemer; Ralph E. Locher

(57) ABSTRACT

A method for operating machinery uses a control unit and a display device for displaying a first user interface of a first application program and at least one second user interface of a second application program. The first user interface and the second user interface form a common display window on the display device.

10 Claims, 2 Drawing Sheets

(56) References Cited

U.S. PATENT DOCUMENTS

| | | | |
|---|---|---|---|
| 7,328,347 B2 | 2/2008 | Keim et al. | |
| 7,403,730 B2 | 7/2008 | Bardolatzy et al. | |
| 7,808,676 B2 | 10/2010 | Huber et al. | |
| 7,913,191 B2 | 3/2011 | Asakawa et al. | |
| 7,950,063 B2 | 5/2011 | Oelsner | |
| 8,166,417 B2 | 4/2012 | Iijima | |
| 8,514,450 B2* | 8/2013 | Kawano | 358/1.9 |
| 2003/0023333 A1 | 1/2003 | Birkle | |
| 2004/0210330 A1 | 10/2004 | Birkle | |
| 2005/0188057 A1 | 8/2005 | Joo | |
| 2006/0070008 A1 | 3/2006 | Sauve et al. | |
| 2006/0190824 A1* | 8/2006 | Montulli et al. | 715/731 |
| 2008/0072896 A1* | 3/2008 | Setzer et al. | 128/200.24 |
| 2008/0115081 A1 | 5/2008 | Sankaravadivelu et al. | |
| 2008/0152411 A1* | 6/2008 | Konig | B41F 33/0009 400/70 |
| 2008/0228315 A1 | 9/2008 | Wendner et al. | |
| 2009/0082951 A1* | 3/2009 | Graessley | 701/200 |
| 2010/0180227 A1 | 7/2010 | Diallo | |

FOREIGN PATENT DOCUMENTS

| | | | |
|---|---|---|---|
| DE | 10 2007 056 879 A1 | 6/2008 | |
| EP | 1 208 979 A1 | 5/2002 | |
| EP | 1279076 A2 | 1/2003 | |
| JP | H06124185 A | 5/1994 | |
| JP | H0784744 A | 3/1995 | |
| JP | H11123808 A | 5/1999 | |
| JP | H11167478 A | 6/1999 | |
| JP | H11232005 A | 8/1999 | |
| JP | 2000194474 A | 7/2000 | |
| JP | 2001014133 A | 1/2001 | |
| JP | 2001501007 A | 1/2001 | |
| JP | 2002166616 A | 6/2002 | |
| JP | 2003016502 A | 1/2003 | |
| JP | 2004177614 A | 6/2004 | |
| JP | 2004355648 A | 12/2004 | |
| JP | 2004537810 A | 12/2004 | |
| JP | 2005010838 A | 1/2005 | |
| JP | 2005018711 A | 1/2005 | |
| JP | 2006515442 A | 5/2006 | |
| JP | 2006244078 A | 9/2006 | |
| JP | 2007122306 A | 5/2007 | |
| JP | 2007249754 A | 9/2007 | |
| JP | 2008159060 A | 7/2008 | |
| JP | 2008298777 A | 12/2008 | |
| JP | 2010015520 A | 1/2010 | |
| JP | 2010049496 A | 3/2010 | |
| JP | 2011150671 A | 8/2011 | |
| WO | 0167190 A2 | 9/2001 | |

OTHER PUBLICATIONS

Yoshifumi Suzuki, "Global Interface" Automation, Nikkan Kogyo Shimbun Ltd., Apr. 1, 1997, vol. 42, No. 4, pp. 51-56—English abstract.

Anonymous: "Machine", Wikipedia, Dec. 29, 2008 (Dec. 19, 2008), found on the Internet (Sep. 16, 2016) URL:https:// web.achive.org/web/200812191556528/http://en.wikipedia.org/wiki/Machine.

* cited by examiner

METHOD FOR OPERATING MACHINERY USING A BROWSER

CROSS-REFERENCE TO RELATED APPLICATION

This application claims the priority, under 35 U.S.C. § 119, of German patent Application DE 10 2010 051 028.9, filed Nov. 11, 2010; the prior application is herewith incorporated by reference in its entirety.

BACKGROUND OF THE INVENTION

Field of the Invention

The present invention relates to a method for operating machinery using a control unit and a display device with a first user interface of an application program and at least one user interface of a second application program being displayed on the display device.

Standard operating systems such as Windows® are known to display every application program on the screen in its own display window. When a user wants to switch from the user interface of a first program to the user interface of a second program, he or she needs to use a suitable operating device such as a mouse to switch the second program into the foreground or to close one user interface.

Moreover, it is known from European Published Patent Application EP 1 208 979 A1 to equip a printing press control with a network browser as a user interface. For that purpose, common standard network browsers like the ones used with Windows® are used.

Furthermore, German Published Patent Application DE 10 2007 056 879 A1, corresponding to U.S. Patent Application Publication No. US 2008/0152411 A1, discloses equipping peripheral devices for printing presses with their own user interfaces in the form of browsers to ensure that user interfaces for new peripheral devices can be easily and flexibly integrated into the operating system of an existing printing press.

A considerable disadvantage of the prior art is that for every device in use, a browser application in the form of a user interface needs to be started. Thus, if an operator needs to operate a number of devices at the same time, he or she needs to switch from one display window to another. Switching between user interface display windows as is known from Windows® is an inconvenience for the operator and may cause operating errors if the operator selects the wrong window.

SUMMARY OF THE INVENTION

It is accordingly an object of the invention to provide a method for operating machinery, which overcomes the hereinafore-mentioned disadvantages of the heretofore-known methods of this general type and which ensures convenient and easy operation of a number of devices with a number of user interfaces.

With the foregoing and other objects in view there is provided, in accordance with the invention, a method for operating machinery. The method comprises providing a control unit and a display device connected to the control unit. A first user interface of a first application program and at least one second user interface of a second application program are displayed on the display device. A common display window with the first user interface and the at least one second user interface is formed on the display device.

The method of the invention is particularly suitable for operating machines that require safe operation without program failures. This particularly applies to machinery such as printing presses that may have dangerous machine conditions. In accordance with the invention, at least two application programs run on the control unit of the machine. Each of the application programs has its own user interface. Both application programs are displayed on a display device such as a screen. In accordance with the invention, the first user interface and the second user interface form a joint display window on the screen. A considerable advantage of such a method is that when using two user interfaces, the operator or user does not have to switch between two windows as is the case in Windows®. He or she only needs to monitor the one display window. In order to carry out actual user commands, the technical switching of the individual application programs to the background or to the foreground is carried out in the background without the operator noticing. The operator will only see one display window including portions of both user interfaces at all times. A considerable advantage is that a failure of one user interface does not cause the other user interfaces to crash as well, because there are two separate programs that run in parallel. So far, according to the prior art, for example, the second user interface was a browser and thus an immediate part of the machine operation user interface. Consequently, a failure of the browser inevitably caused the machine operation user interface and thus the entire printing press to crash. Now, in contrast, according to the invention, machine operation and browser are two separate applications, the user interfaces of which do not influence each other.

In accordance with another mode of the invention, the second user interface is a browser application, in particular based on HTML or a Java applet. An HTML browser or Java applet is particularly suitable because peripheral devices, in particular, are easy to program for these programs. In addition, HTML has become a standard for browsers and Java a standard for small application programs. However, the technology behind the second user interface is of no importance to the user because the second user interface is integrated into the common display window with the first user interface so that the user cannot realize that he or she is actually confronted with two user interfaces. Thus, the operation of the printing press using a first user interface in parallel with a browser user interface as a second user interface for operating peripheral devices can be implemented as a common display window, thus giving the user the impression that what he or she sees is a common user interface for the printing press and for the peripheral devices.

In accordance with a further mode of the invention, the first user interface and the second interface are controlled in the common display window by a superordinate program. This superordinate program is able to open and close the first user interface and the second user interface independently of each other, thus preventing a failure of one user interface from influencing the other user interface. The user does not have to take care of the opening or closing of the user interfaces because he or she only sees a single common display window and does not realize that the user interfaces are individual applications. Since the window technology known from Windows® is dispensed with, the unintentional closing of a window of an application that an operator still needs is eliminated as a potential source of error. In accordance with the present invention, the task of starting up and shutting down applications no longer falls to the user but is the job of the superordinate program that monitors and controls the first user interface and the second user interface.

In accordance with an added mode of the invention, the first user interface technically runs in the background and the second user interface technically runs in the foreground on the display device. In this context, background and foreground indicate that the active user interface runs in the foreground and the unused user interface runs in the background. However, the user will not see any visible difference on the display device since the display does not change because there are no windows that need to be switched to the foreground or to the background. Thus, background and foreground denominate the technical sequence. The active program runs in the foreground, the inactive program runs in the background. In technical terms, the machine operation runs in the background while the second user interface runs in the foreground on the screen in the form of a browser application. Despite the browser running in the foreground, however, the user needs to be able to operate the machine without letting the browser disappear into the background. It may occur that the machine operation, which is in the background, opens a so-called pop-up window, which nevertheless still belongs to the first user interface of machine operation running in the background. This pop-up window may be smaller than the browser surface of the second user interface and is to be displayed in the foreground, i.e. above the browser. In order to implement this, the user interface needs to be switched to the foreground, with the pop-up window coming to rest upon the user interface.

In accordance with an additional mode of the invention, when the first user interface is switched to the foreground, a freeze frame including a screenshot of the second user interface is displayed at the position of the second user interface on the display device. If this was not the case, there would be a black hole at the location at which the browser of the second user interface had been displayed. In order to prevent the user from noticing any of these proceedings, a screenshot of the browser of the second user interface is taken and is displayed at the same location as the first user interface for machine operation before the pop-up window is opened. The pop-up window of the first user interface will then be displayed above the screenshot of the second user interface. The browser of the second user interface is then invisible in the background.

In accordance with a concomitant mode of the invention, the pop-up window of the first user interface is displayed above the displayed screenshot and when the pop-up window of the first user interface is closed, the second user interface is displayed in the foreground in the location of the screenshot. Once the pop-up window of the first user interface has been closed, the browser of the second user interface is switched to the foreground and appears exactly in the location of the screenshot so that the user will not realize that what he or she is seeing now is the second user interface of the browser instead of the screenshot.

Other features which are considered as characteristic for the invention are set forth in the appended claims.

Although the invention is illustrated and described herein as embodied in a method for operating machinery using a browser, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
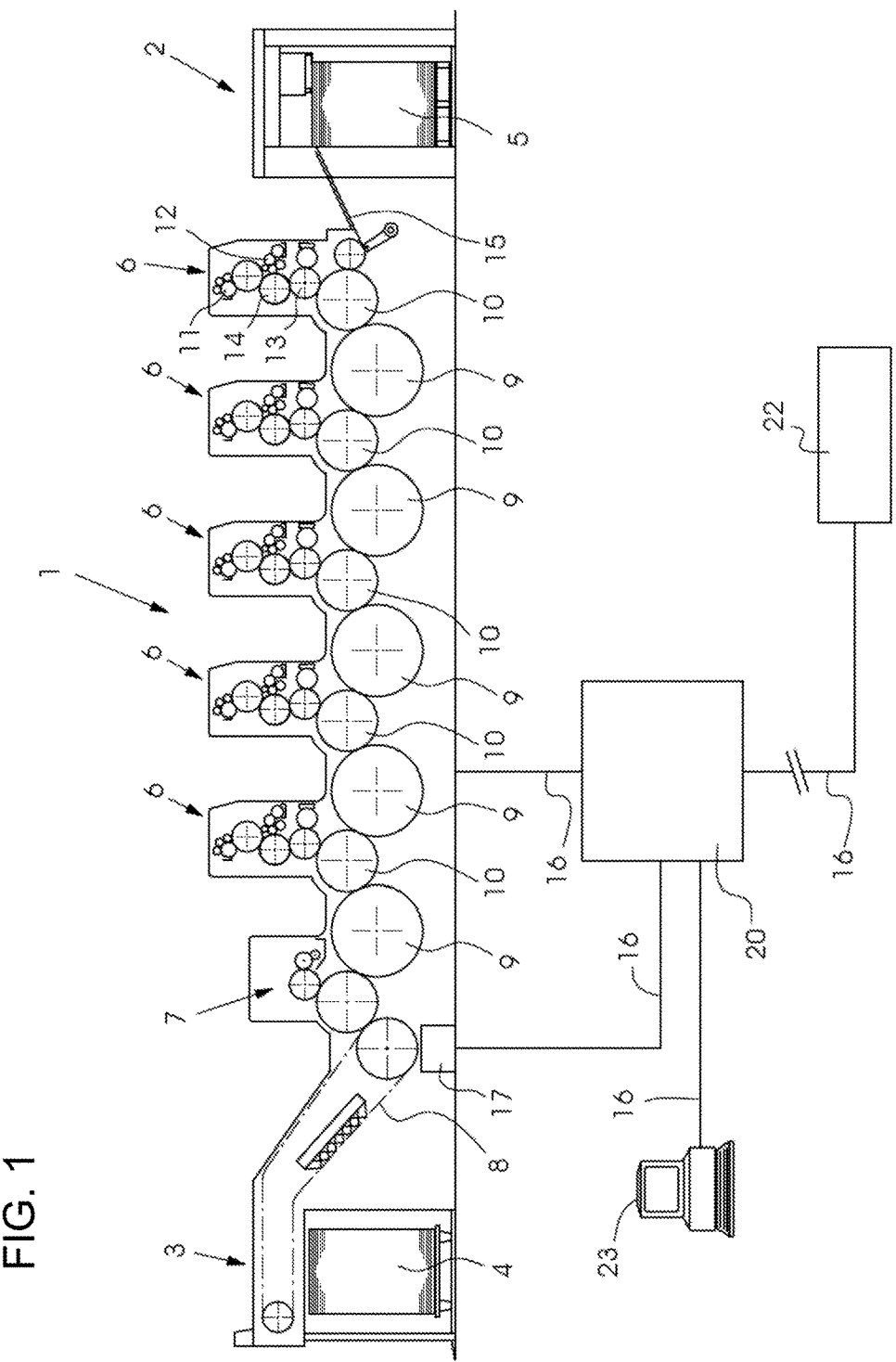
FIG. 1 is a diagrammatic, longitudinal-sectional view of a sheet-fed printing press and its control components.

Referring now to the figures of the drawings in detail and first, particularly, to FIG. 1 thereof, there is seen a printing press 1 including five printing units 6 and a downstream varnishing unit 7. Sheet-shaped printing substrates are taken from a feeder stack 5 located in a feeder 2 and are fed to the first printing unit 6 over a suction belt table 15. The printing units 6 have a substantially identical construction and include an impression cylinder 10, a blanket cylinder 13, a plate cylinder 14, an inking unit 11 and a dampening unit 12. The sheets are transported between the printing units 6 and through the printing units 6 and the varnishing unit 7 through the use of transport cylinders 9. A color measurement device 17 is provided at an exit of the varnishing unit 7 for examining the quality of a printed image on the substrates and for transmitting this information to a control unit 20 of the printing press through the use of a communication link 16. The finished printing substrates are deposited on a delivery stack 4 in a delivery 3 through the use of a delivery chain 8.

Figure 2:
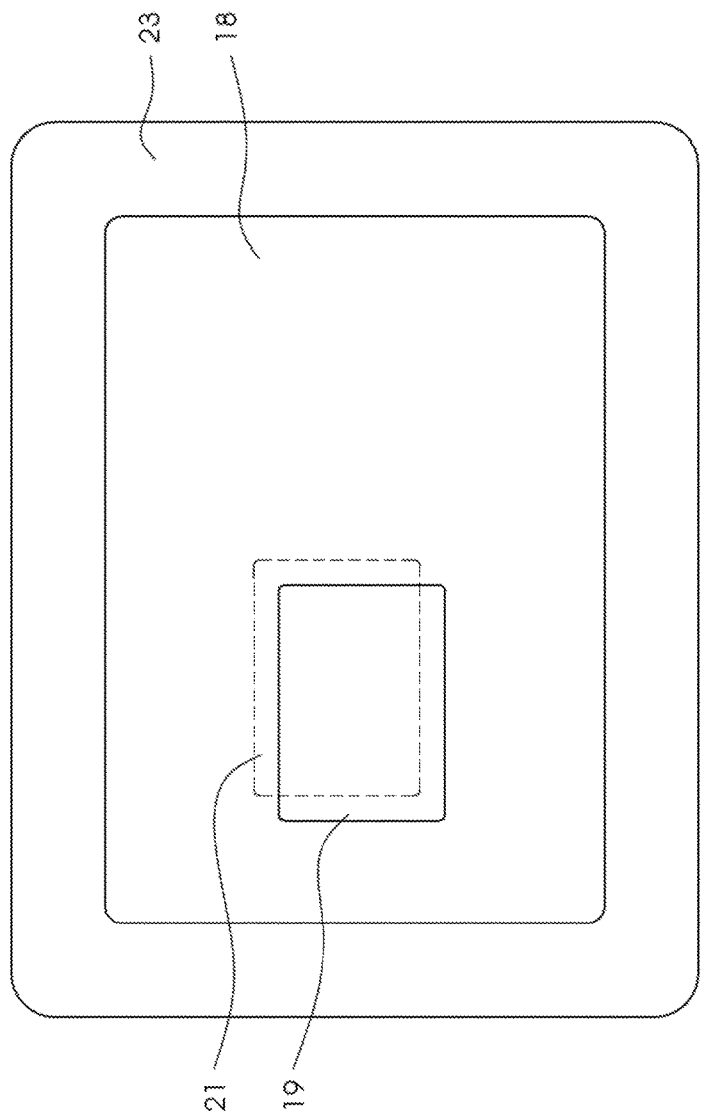
FIG. 2 is a front-elevational view of a display device in accordance with the invention including a display window for displaying at least two user interfaces.

The control unit 20 controls both a main drive of the printing press 1 and various actuating motors in the printing units 6 as well as associated peripheral devices such as compressed air supply or powdering devices in the delivery 3. The control unit 20 is operated by using a screen 23 and an associated computer that is connected to the control unit 20 through a communication link 16. In addition, another color measurement device embodied as a table color measurement device 22 is connected to the control unit 20 so as to be able to examine printed substrates taken from the delivery stack 4 in terms of print quality. Different user interfaces are provided for operating the printing press 1 and for operating the peripheral devices. In the illustrated example, two user interfaces 18, 19 are shown in FIG. 2. However, there may be more than two.

As shown in FIG. 2, the first user interface 18 and the second user interface 19 are displayed in a common window on the screen 23, which is a touchscreen. Thus, the user does not have to switch between different display windows for different user interfaces as is the case, for instance, in the Windows® operating system. In FIG. 2, the first user interface 18 is currently inactive and has been switched to the background, whereas the second user interface 19 is displayed as the active user interface that has been switched to the foreground. When the operator wants to access the first user interface 18, he or she may touch the corresponding area around the second user interface 19 or click on the corresponding area by using a mouse. Initially, this will have no visible effect. In this context, the first user interface 18 will frequently generate a so-called pop-up window, which will then be displayed above the second user interface 19. Since the pop-up window is smaller than the second user interface 19, a black hole would appear if the first user interface 18 was switched to the foreground. This is avoided in accordance with the present invention due to a background image 21 of the second user interface 19. Since the background image 21 is a screenshot of the second user interface 19, the user will not notice that the second user interface 19 has been switched into the background.

An important advantage of this way of operating machinery is that since two user interfaces 18, 19 are displayed in a common display window on the screen 23, the operator will not realize that there are two different user interfaces 18, 19 and not a common user interface. If one of the user interfaces 18, 19 crashes, it may be restarted by the control unit 20 independently of the other user interface to prevent the first user interface, which is preferably the machine user interface, from failing likewise upon a crash of the second user interface 19, which is a user interface for operating peripheral devices. In this case, too, a screenshot 21 will be displayed as long as the crashed user interface is not running in order to ensure that the user notices as little of the crash as possible. In addition to making the operation of machinery more convenient, another advantage of the present invention is that it provides a more reliable and safer way of operating the printing press 1. In this context, the second user interface 19 is preferably an HTML browser or a Java applet.

The invention claimed is:

1. A method for operating machinery, the method comprising the following steps:
   providing a control unit;
   providing a display device connected to the control unit;
   displaying a first user interface of a first application program, wherein the first user interface is a user interface configured for operating a printing machine, and at least one second user interface of a second application program, wherein the at least one second user interface is configured for operating peripheral devices of the printing machine, on the display device; and
   displaying, on the display device, the first user interface of the first application program and the at least one second user interface of the second application program, wherein the first user interface is a user interface configured for operating a printing machine that includes printing units having sheets transported between and through the printing units by transport cylinders, and the at least one second user interface is configured for operating peripheral devices of the printing machine, the peripheral devices including a compressed air supply;
   forming a common display window on the display device with the first user interface and the at least one second user interface, the first user interface running in the background and the at least one second user interface running in the foreground on the display device while the first user interface and the at least one second user interface are operating without any visible change on the display device.

2. The method according to claim 1, wherein the at least one second user interface is a browser application.

3. The method according to claim 2, wherein the browser application is based on HTML or a Java applet.

4. The method according to claim 1, which further comprises controlling the first user interface and the at least one second user interface in the common display window with a superordinate program.

5. The method according to claim 4, which further comprises generating at least one pop-up window with the first user interface, the at least one pop-up window being smaller than the at least one second user interface.

6. The method according to claim 5, which further comprises upon switching the first user interface to the foreground, displaying a freeze image at a position of the at least one second user interface on the display device, and including in the freeze image a screenshot of the at least one second user interface displayed at a location of the at least one second user interface.

7. The method according to claim 6, which further comprises displaying the pop-up window of the first user interface above the displayed screenshot, and upon closing the pop-up window of the first user interface, displaying the second user interface in the foreground at a location of the screenshot.

8. The method according to claim 1, which further comprises generating at least one pop-up window with the first user interface, the at least one pop-up window being smaller than the at least one second user interface.

9. The method according to claim 8, which further comprises upon switching the first user interface to the foreground, displaying a freeze image at a position of the at least one second user interface on the display device, and including in the freeze image a screenshot of the at least one second user interface displayed at a location of the at least one second user interface.

10. The method according to claim 9, which further comprises displaying the pop-up window of the first user interface above the displayed screenshot, and upon closing the pop-up window of the first user interface, displaying the second user interface in the foreground at a location of the screenshot.

* * * * *